(No Model.)
P. RICHTER.
DEVICE FOR LIGHTING PETROLEUM OR GAS LAMPS.
No. 282,227. Patented July 31, 1883.
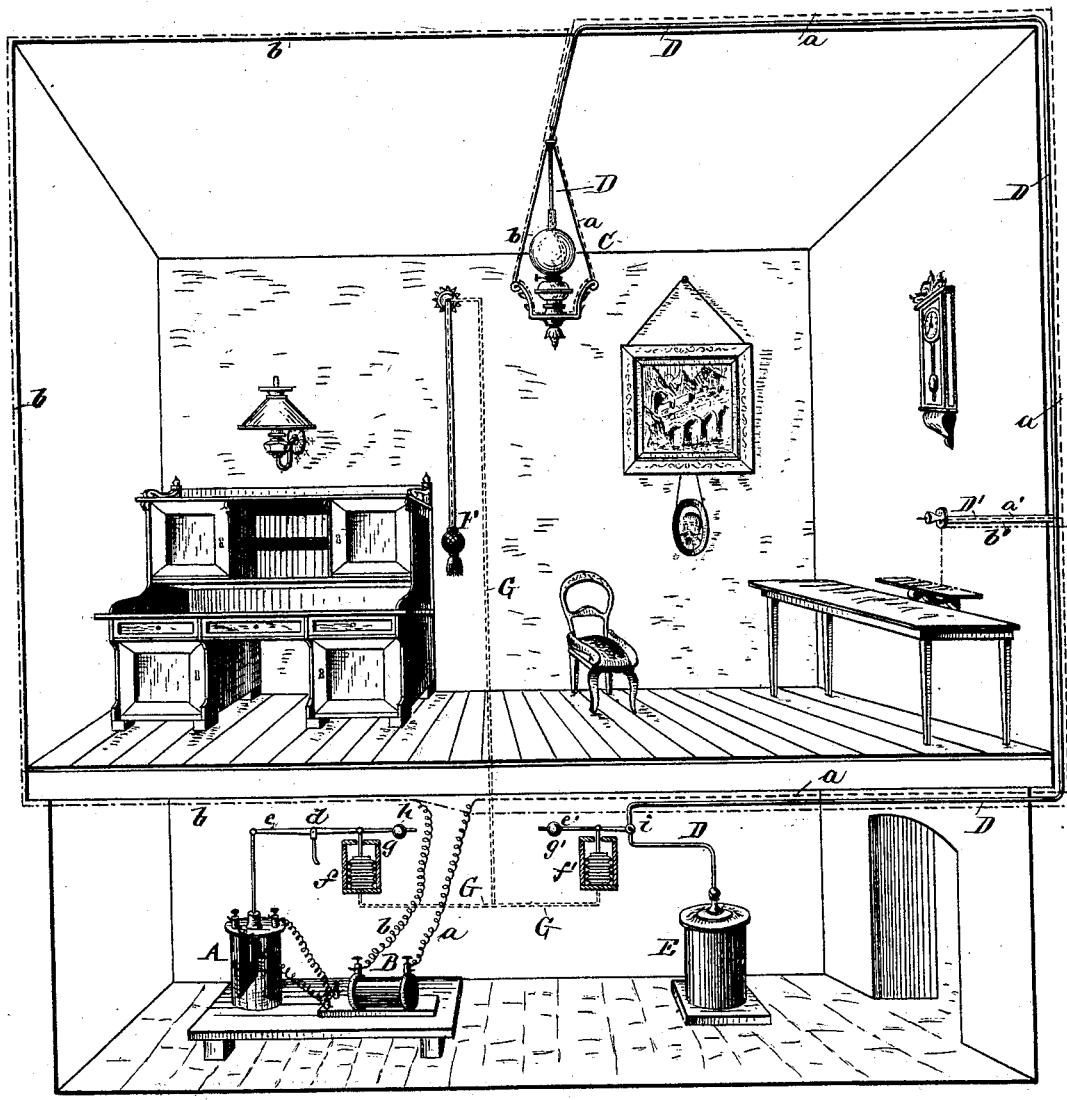
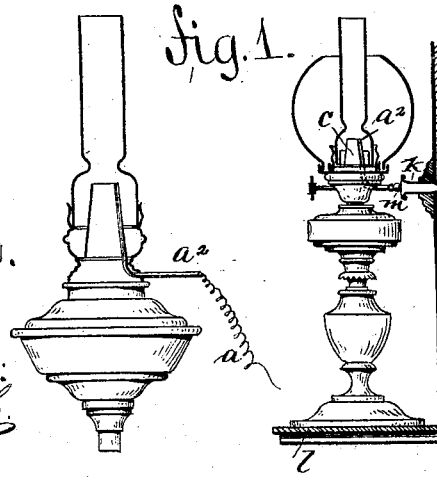
WITNESSES:
Joh. N. Rosenbaum
Otto Risch
INVENTOR
Paul Richter
by
Paul Goepel
ATTORNEY

UNITED STATES PATENT OFFICE.

PAUL RICHTER, OF POTSDAM, PRUSSIA, GERMANY.

DEVICE FOR LIGHTING PETROLEUM OR GAS LAMPS.

SPECIFICATION forming part of Letters Patent No. 282,227, dated July 31, 1883.

Application filed April 23, 1883. (No model.)

*To all whom it may concern:*

Be it known that I, PAUL RICHTER, a subject of the King of Prussia, German Empire, residing at the city of Potsdam, in the Kingdom of Prussia, German Empire, have invented certain new and useful Improvements in Electro-Pneumatic Devices for Lighting Petroleum or Gas Lamps, of which the following is a specification.

This invention has reference to an improved electro-pneumatic device for lighting a number of petroleum or gas lamps at the same time by the simple pressure of an elastic rubber bulb or by the pulling of a cord; and the invention consists of a lighting device for fixed or portable lamps, in which are combined with the lamp electric conducting-wires for producing an electric spark, means for supplying a current of hydrogen gas, and means for generating an electric current and supplying a small quantity of hydrogen gas, as will more fully appear hereinafter, and finally be pointed out in the claims.

In the accompanying drawings, Figure 1 represents a perspective view of a room having a fixed lamp depending from the ceiling and a stationary device for lighting portable lamps, both being placed in connection with an electric battery and an apparatus for generating hydrogen gas, and with means for throwing the same simultaneously into operation; and Fig. 2 is an elevation, partly in section, of a stationary lamp provided with this improved lighting device; Fig. 3, a similar view of a portable lamp provided with said improvements.

Similar letters of reference indicate corresponding parts.

In my improved system of lighting stationary or portable petroleum or gas lamps by electro-pneumatic means the lamp or lamps C are placed into an electric circuit, which is composed of an electric battery, A, an induction-coil, B, and of conducting-wires $a\ b$, which lead along the supporting-frame of the lamp and along the fount to the burner. If the lamp-frame is made of metal that is a good conductor of electricity, it can be used directly as the continuation of one wire, while the second line-wire has to be insulated therefrom, and is also conducted along the burner in suitable proximity to the first wire.

The electric battery A is constructed in the nature of a dip-battery, in which the metal plates of the same are dipped into the exciting-liquid by means of a lever, $e$, that is fulcrumed at $d$, and provided with a balancing-weight, $h$. This weight $h$ is somewhat heavier than the metal plate that is suspended from the opposite end of the lever $e$. The lever $e$ is further connected, by a rod, $g$, with a bellows or other pneumatic device, $f$, which is connected by an air-conducting tube, G, to a flexible bulb, F, that is arranged at any suitable point in the room, so that by the simple compression of the bulb F air is forced through the air-conducting pipe G into the bellows $f$, which, by the fulcrumed lever $e$, dips the metal plate into the exciting-liquid, so as to cause thereby the generation of an electric current and the passage of a spark from one terminal wire to the other at the burner of the lamp or lamps.

In lighting petroleum-lamps a small quantity of hydrogen gas is supplied to the burner in connection with the electric current. This gas is generated in an apparatus, E, of any approved construction, from which leads a thin tube, D, along the wall and ceiling of the room and along the frame to the burner of the lamp, the conducting-wire $a$ being preferably conducted through the tube D, so as to terminate at the upper end of the same. A stop-cock, $i$, in the gas-conducting pipe D is connected, by a weighted lever, $e'$, to a connecting-rod, $g$, of a second bellows, $f'$, that is, like the bellows $f$, connected with the air-conducting tube G and the bulb F, so that by compression of the bulb an electric spark passes between the terminals of the wires $a\ b$, while the hydrogen gas is simultaneously supplied to the burner. The spark, in passing from one terminal wire to the other, ignites the hydrogen gas, and thereby the burner of the lamp.

In place of the pneumatic arrangement described, the electric battery may be thrown into action and the hydrogen-gas apparatus opened by means of a pull-cord, bell-cranks, and connecting-wires, so that the simple pulling of the cord suffices to light the lamp or lamps.

For the purpose of using the arrangement described, also for the lighting of portable lamps, a fixed lighting arrangement is used, which consists of conducting-wires $a'\ b'$ and of a tube, D', which are respectively branched off from the line-wires $a\ b$ and the tube D. The branch wire $a'$ is connected to the socket-shaped terminal end $k$ of the branch tube D', while the other branch wire, $b'$, is connected to a stationary metallic bracket, $l$. When the supporting-stand of the lamp is of metal, it is in direct electric contact with the wires $a'$ $b'$ when placed on the bracket $l$, as shown in Fig. 3; but when the same should be of some other material metallic contact-terminals are used, so that the current is conducted along or through the lamp-support to the burner. The terminal of the wire $a'$ is at such a distance from the terminal of the wire $b'$ that the spark can readily pass from one to the other when the electric battery is dipped. The burner is also provided with a short connecting-tube, $a^2$, through which passes a terminal portion of one of the conducting-wires that terminates in an enlarged button, $m$. When the lamp is placed on the bracket $l$ and its button $m$ is pressed against the enlarged socket-shaped terminal $k$ of the hydrogen-conducting tube D', it can be lighted in this position by compressing the bulb F, whereby the battery is called into action, a current generated, the stop-cock $i$ of the hydrogen-generating apparatus opened and hydrogen supplied to the lamp, which is lighted by the passage of the spark between the terminals of the wires $a'$ $b'$.

When the apparatus is used for lighting gas-lamps, the hydrogen apparatus and its conducting-pipes may be dispensed with, as in this case the lamps are lighted directly by the electric spark.

The electric battery and the hydrogen apparatus may be located in the basement, or at any other place most convenient to the location of the lamps to be lighted.

Having thus described my invention, I claim as new and desire to secure by Letters Patent—

1. A device for lighting lamps, consisting of electric wires $a'$ $b'$, the burner, weighted lever $e$, and rod $g$, a bellows, $f$, or other pneumatic device, the air-conducting pipe G, the flexible bulb F, the tube D, for conducting hydrogen gas to the burner of a lamp, and an electric battery, substantially as described.

2. The combination, with a lamp, C, having a small tube, $c$, and electric wire leading to the burner, a fixed metallic bracket, $l$, a hydrogen-conducting tube, D', having an enlarged terminal, $k$, an apparatus, E, for supplying hydrogen gas, means for supplying a current of electricity, conducting-wires $a'$ $b'$, leading to the bracket $l$ and terminal $k$, and means for actuating simultaneously the current-generating device and the hydrogen apparatus for lighting the lamps, substantially as set forth.

In testimony whereof I have signed my name to this specification in the presence of two subscribing witnesses.

PAUL RICHTER.

Witnesses:
GERARD VON NAWROCKI,
G. H. SMITH.